United States Patent
Holmgren et al.

(10) Patent No.: US 7,277,442 B1
(45) Date of Patent: Oct. 2, 2007

(54) ETHERNET-TO-ATM INTERWORKING THAT CONSERVES VLAN ASSIGNMENTS

(75) Inventors: Stephen L Holmgren, Little Silver, NJ (US); David Kinsky, High Bridge, NJ (US); John Babu Medamana, Colts Neck, NJ (US); Mateusz W. Szela, Hillsborough, NJ (US)

(73) Assignee: AT&T Corp., New York, NY (US)

( * ) Notice: Subject to any disclaimer, the term of this patent is extended or adjusted under 35 U.S.C. 154(b) by 941 days.

(21) Appl. No.: 10/134,569

(22) Filed: Apr. 26, 2002

(51) Int. Cl.
*H04L 12/28* (2006.01)
*H04L 12/26* (2006.01)
*H04J 3/24* (2006.01)

(52) U.S. Cl. .................. 370/395.53; 370/216; 370/242; 370/389; 370/465; 370/395.54; 370/395.63; 370/474

(58) Field of Classification Search ............ 370/395.52, 370/395.5, 401, 465, 466, 474, 216, 242, 370/389, 392, 351, 395.53, 395.54, 395.63
See application file for complete search history.

(56) References Cited

U.S. PATENT DOCUMENTS

| | | | | |
|---|---|---|---|---|
| 5,818,842 A * | 10/1998 | Burwell et al. | ............. | 370/397 |
| 6,104,696 A * | 8/2000 | Kadambi et al. | ........... | 370/218 |
| 6,154,770 A * | 11/2000 | Kostakos | ..................... | 709/217 |
| 6,400,730 B1 * | 6/2002 | Latif et al. | .................. | 370/466 |
| 6,771,673 B1 * | 8/2004 | Baum et al. | ................ | 370/535 |
| 7,130,303 B2 * | 10/2006 | Hadzic | ........................ | 370/389 |
| 2002/0131414 A1 * | 9/2002 | Hadzic | ........................ | 370/393 |

* cited by examiner

*Primary Examiner*—Wing Chan
*Assistant Examiner*—Venkatesh Haliyur

(57) ABSTRACT

Interworking of first and second networks (12, 14) is accomplished by an interworking facility (30) that serves to map the destination address in first frames received from the first network into second destinations addresses compatible with the second network. To conserve such mapping the assignments, the first network encapsulates information frames (32) received from one or more sites associated with a first customer into jumbo frames (34) that have a generic address associated with that customer. At the interworking facility, the individual frames are stripped from the jumbo frame and routed to corresponding destinations in the second network.

2 Claims, 2 Drawing Sheets

10

ETHERNET-TO-ATM INTERWORKING THAT CONSERVES VLAN ASSIGNMENTS

TECHNICAL FIELD

This invention relates to a technique for interworking Ethernet and ATM networks by mapping Ethernet Virtual Local Area Network (VLAN) identifiers (tags) to ATM network Permanent Virtual Circuits (PVCs).

BACKGROUND ART

Presently, communication service providers, such as AT&T, offer high-speed Asynchronous Transport Mode (ATM) Virtual Private Network (VPN) service to customers. Each ATM-based VPN customer utilizes one or more Permanent Virtual Circuits (PVCs) to route data among different locations (endpoints), each typically located at a separate edge of an ATM network. In practice, traffic originating at an endpoint passes to an edge device on the ATM network for transmission to the network core, which in turn, transmits such traffic to an edge device serving the destination end point. While the edge devices may run one or more different protocols, including ATM or Frame Relay, the network core typically utilizes the ATM protocol. In this environment, ATM PVCs constitute a point-to-point network topology.

Currently, there exists a large embedded base of Ethernet Local Area Networks (LANs). Advances in Ethernet technology have led to the development of Metropolitan Area Networks (MANs) that afford access to the Internet and some limited access to VPNs. Ethernet-based MANs offer significant cost advantages on a per port basis, as compared to Frame Relay and ATM networks. Many VPN customers would like the opportunity to use an Ethernet-based MAN to access their ATM-based VPNs but have not had the ability to do so because of interworking issues. The protocol associated with Ethernet is different than that associated with ATM. Ethernet is a broadcast protocol within level 2 (the data link layer) of the well-known 7-layer OSI model, whereas ATM and Frame Relay is a point-to-point circuit-type protocol within level 2. Ethernet is designated as a broadcast protocol within level 2 because information in an Ethernet network travels in both directions and passes by all devices on the path. A device that recognizes the information intended for itself (as opposed to another device) will pull the information from the network.

U.S. patent application Ser. No. 10/016,019, filed Dec. 12, 2001 in the names of Stephen L. Holmgren, David Kinsky, John Babu Medamana and Mateusz Szela, and assigned to AT&T (incorporated by reference therein) describes a technique for interworking Ethernet to ATM networks. An interworking facility receives frames from a first network that are destined for the second network. Each such frame destined for the second network includes not only the payload, but also a destination address indicative of the endpoint in the second network destined to receive the information in the payload. The destination address is obtained by initially resolving the destinations available to the source, including those available through the second network. In practice, the interworking facility establishes a set of pseudo addresses in a format compatible with the first network that correspond to destinations in the second network so that the source can address an information frame using its own protocol for a destination that actually lies in the second network without concerning itself with the protocol employed in the second network. In the case where the first information frame comes from a source in an Ethernet-based network, the first information frame will have a Virtual Local Area Network (VLAN) tag associated with the address of the destination. On the other hand, if the information frame comes from a source in an ATM network, the frame will include a VPN Virtual Circuit Identifier (VCI), herein after referred to as a Permanent Virtual Circuit (PVC) that corresponds to the address of (e.g., the network path to) the destination in a format compatible with the ATM network, even though the destination lies in another network having a different protocol.

Upon receipt of the first information frame at the interworking facility, the facility forms a second frame (which includes the payload) in a format compatible with the second network. The interworking facility maps destination address of the first frame to a second destination address compatible with the second network. Thus, for example, the VLAN tag in an originating Ethernet frame is mapped to a VPN PVC in an ATM frame and vice versa. Mapping the destination address from a format compatible with the first information frame to a format compatible with the second information frame allows routing of the second frame, including the information embodied in its payload, to the destination.

As described above, the interworking technique of the aforementioned U.S. patent application Ser. No. 10/016,019 permits interworking of Ethernet to Frame Relay or ATM networks by mapping Ethernet VLANs to ATM PVCs and vice versa. While this technique works well, most large Frame Relay and ATM customers typically enjoy hundreds if not thousands of PVCs per access link whereas the VLAN ID space within an Ethernet frame is limited to 12 bits (4096) values, thus limiting mapping.

Thus, there is a need for a technique for expanding the VLAN ID space to enhance Ethernet-to-ATM interworking.

BRIEF SUMMARY OF THE INVENTION

Briefly, there is provided a method for interworking two different networks to allow communication of information frames there between by mapping the address format of one network into the other network while conserving mapping assignments. In a preferred embodiment, a first network serves at least one of a first plurality of sites associated with a particular customer while the second network serves at least one of a plurality of second sites associated with the same customer. To facilitate interworking of the two networks, the first network receives information frames from the first site destined for one or more of the second sites and encapsulates each individual frame into jumbo frames that have a generic address of a first format that identifies the customer. An interworking facility receives each jumbo frame and extracts the encapsulated individual frame that each has a first destination address that specifies, in a first format compatible with the first network, the corresponding one of the plurality of second sites destined to receive the individual frame. The interworking facility makes such first destination addresses available by resolving destinations (i.e., second sites) available to each first site through the second network. For each individual frame extracted from a jumbo frame, the interworking facility forms a second frame of a format compatible with the second network and maps the first destination address to a second destination address compatible with the second network, so that the second network, upon receipt of the second frame, can route the frame to a corresponding one of the second sites.

The above-described method advantageously allows for interworking of a VLAN network to a Frame Relay or ATM network while conserving VLAN assignments. By encapsulating individual VLAN frames from a first site destined for each of a plurality of second sites of the same customer into jumbo frames having a single generic address associated with that customer, the large number of VLAN ID assignments otherwise needed for mapping is greatly reduced.

DETAILED DESCRIPTION

Figure 1:
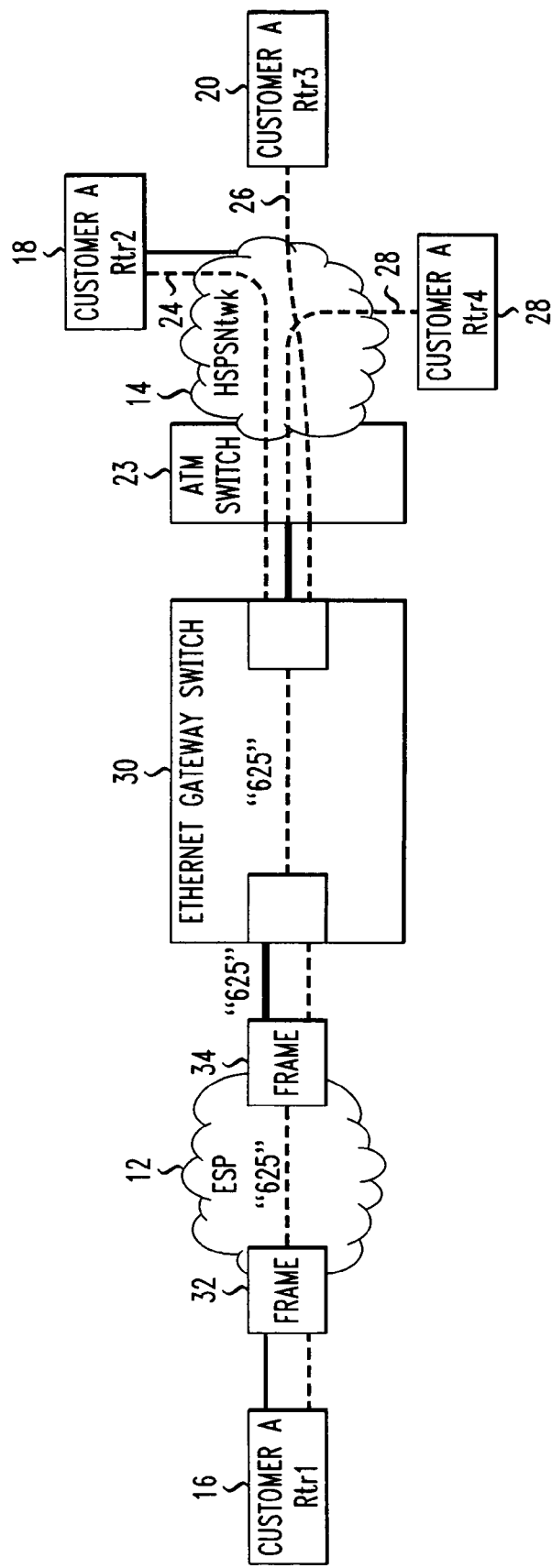
FIG. 1 depicts a block schematic diagram of a network architecture for practicing the method of the invention.

FIG. 1 illustrates a schematic diagram of a network architecture 10 in accordance with an illustrative embodiment of the invention for interworking a first and second networks 12 and 14, respectively, while minimizing address mapping assignments in the manner discussed below. In the illustrated embodiment of FIG. 1, the network 12 takes the form of an Ethernet Metropolitan Area Network or the like operated by an Ethernet Service Provider (ESP) that provides Ethernet network service to at least one site 16 associated with a particular customer, hereinafter designated as Customer A. In practice, the network 12 may serve a plurality of separate sites (not shown) of Customer A as well as one or more sites of other customers (not shown). A site 16 on the Ethernet network 12 can easily route traffic, in the form of Ethernet information frames, to other sites of the same customer within the Ethernet network by appropriately setting a Virtual Local Access Network (VLAN) identifier in each Ethernet frame.

In addition to maintaining one or more sites, such as site 16, on the Ethernet network 12, Customer A may also maintain one or more sites, such as sites 18, 20, and 22, on the network 14. In the illustrated embodiment, the network 14 takes the form of a High Speed Packet Service (HSPS) network which routes traffic, in the Frame Relay or ATM frames, to each of the sites 18, 20, and 22 through an ATM switch 23 via a corresponding one of Permanent Virtual Circuits 24, 26, and 28, respectively.

Often, Customer A will have the need to send information from one of the sites, such as site 16, on the Ethernet network 12, to one of the sites, such as site 18, on the HSPS network 14. Unfortunately, the protocol associated with Ethernet is different than the protocol associated with ATM and Frame Relay, making direct routing of an Ethernet frame between the networks 12 and 14 impossible. Ethernet is a broadcast protocol within level 2 (the data link layer) of the well-known 7-layer OSI model, whereas ATM and Frame Relay is a point-to-point circuit-type protocol within level 2. Ethernet is designated as a broadcast protocol within level 2 because information in an Ethernet network travels in both directions and passes by all devices on the path. A device that recognizes the information intended for itself (as opposed to another device) will pull the information from the network.

Our co-pending U.S. patent application Ser. No. 10/016,019 (incorporated by reference herein) describes a technique for interworking an Ethernet network such as Ethernet network 12 with an ATM or Frame Relay network, such as HSPS network 14, by way of an Ethernet gateway switch 30. At the outset of operation, the Ethernet gateway switch 30 first resolves for each of source of Ethernet traffic in the Ethernet network 12 (such as customer site 16) a corresponding Ethernet address for each available site (e.g., customer sites 18, 20, and 22) within the HSPS network 14. By the same token, the Ethernet gateway switch 30 resolves, for each of the customer sites 18-22 corresponding PVC routing addresses for each site (e.g., site 16) served by the Ethernet network 12. In actuality, the customer sites 18-22 do not actually have Ethernet addresses nor does the customer site 16 have a PVC routing address. Rather, the Ethernet gateway switch 30 resolves (i.e., makes available) such pseudo addresses so that the customer sites served by each network effectively appear in the other network.

After resolving the addresses for the customer sites in each of the networks 12 and 14, the Ethernet gateway switch 30 facilitates the transmission of traffic from one network to another. Upon receipt of traffic, in the form of a frame from a first network (i.e., an Ethernet frame from the Ethernet network 12), the Ethernet gateway switch 30 facility forms a second frame (e.g., a Frame Relay or ATM frame) compatible with the other network (e.g., the HSPS network 14). The second frame includes the information payload from the first frame.

In forming the second frame, the Ethernet gateway switch 30 maps the destination address of the first frame to a second destination address compatible with the second network. Thus, for example, for an Ethernet frame received from the customer site 16 in the Ethernet network 12, the Ethernet gateway switch 30 maps the VLAN tag to a corresponding PVC for a Frame Relay or ATM frame. Conversely, upon receipt of a Frame Relay or ATM frame from the HSPS network 14, the Ethernet gateway switch 30 maps the PVC associated with that frame to a corresponding VLAN tag compatible with the Ethernet network 12. Mapping the destination address of the received frame to a format compatible with the destination network allows routing of the payload to its destination (i.e., the corresponding customer site in the destination network).

To facilitate such address mapping, the Ethernet gateway switch 30 typically includes one or more tables (not shown) that cross reference VLAN tags to corresponding PVCs and vice versa. In a typical Frame relay or ATM network, such as HSPS network 14, a customer, such as Customer A, may have hundreds if not thousands of PVCs per access link. On the other hand the VLAN tag within an Ethernet frame is limited to twelve bits in length, allowing for a maximum number of 4096 values. Thus, with present day techniques, a site, such as site 20 in the HSPS network 14, can only map to only one of 4096 sites in the Ethernet network 12. For a large customer, mapping to a larger number of sites within the Ethernet network (>4096) may have value.

In accordance with present principles, VLAN assignments may be conserved, yet allow for a large number of such mappings by stacking Ethernet frames in the following manner. Referring to FIG. 1, a customer site, such as customer site 16, will send individual Ethernet frames, such as frame 32, into the Ethernet network 12. Each frame 32 has a VLAN tag as depicted in FIG. 2 that identifies a corresponding site in the network 14 served by the same customer to which the frame is destined. In the illustrated embodiment of FIG. 1, each frame 32 may contain a VLAN tag (e.g. between 20 and 400) as sub-interfaces to different remote sites (i.e., different sites in the network 14). The ESP network 12 advantageously encapsulates each frame 32 destined for sites in the network 12 associated with the same customer (e.g., customer A) into a corresponding jumbo frame 34. The jumbo frame 34 has a single VLAN tag, e.g., 625, identifying the customer (e.g., customer A) whose sites in the network 14 are destined to receive the individual frames encapsulated in the jumbo frames. The VLAN 625 terminates on an ATM interface inside the Ethernet gateway switch 30.

The Ethernet network 12 routes the jumbo frame 34 to the Ethernet gateway switch 30 which then removes the encapsulation and its VLAN tag of 625 (i.e., "pops" the VLAN stack) which identifies this as a frame for Customer A. The Ethernet Gateway Switch then performs the requisite address mapping as discussed previously to map the Ethernet VLAN tag in each original frame 32 to the corresponding PVC associated with Customer A's site in the network 14 destined to receive that frame. In this way, the large numbers of VLAN tags needed for mapping to corresponding PVCs are confined to inside the Ethernet gateway switch 30. The single VLAN 625 can be used by the Ethernet service provider to carry all of customer A's different VLANs to the Ethernet gateway switch 30.

Figures 2A, 2B:
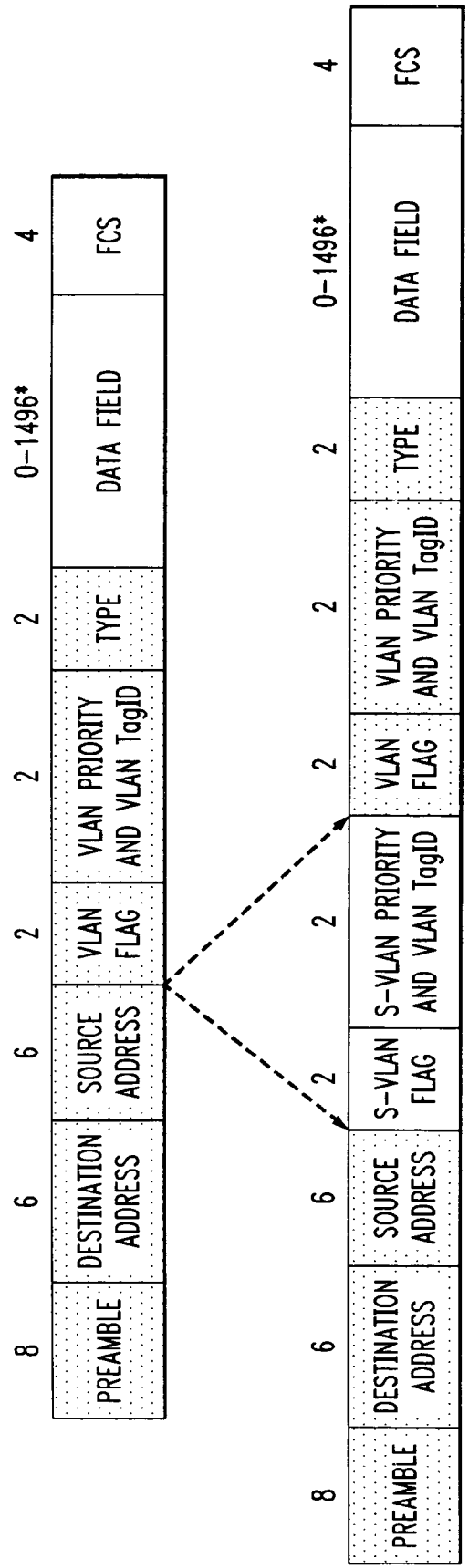
FIGS. 2A and 2B depict the relationship between an individual frame from a first network within the network architecture of FIG. 1 and a jumbo frame into which the first frame is encapsulated.

FIGS. 2A and 2B illustrate the relationship between each individual frame 32 and the jumbo frame 34 into which the individual frame is encapsulated. As depicted in FIG. 2A, each frame 32 has a conventional Ethernet format and includes the following fields and corresponding bit size

| Field Designator | Bit Size |
|---|---|
| Preamble | 8 |
| Destination Address | 6 |
| Source Address | 5 |
| VLAN Flag | 2 |
| VLAN Priority and Tag ID | 2 |
| Type | 2 |
| Data field | 0-1496 |
| FCS | 4 |

The customer provides input frames using the format shown in FIG. 2A and identifying the customer's different VLANs using multiple VLAN IDs.

As depicted in FIG. 2B, the "jumbo" Ethernet frame 34 has a header format similar to the conventional Ethernet frame 32, and contains all of the information in the entire original frame. However, the customer frame 32 is altered by inserting a new VLAN field (referred to in FIG. 2 as a stackable VLAN field or "S-VLAN" field) which is used by the Ethernet Service Provider only for that customer. The jumbo frame 34 now carries VLAN tag information, e.g. a stackable VLAN tag ID of 625, that is inserted at the location specified in FIG. 2B. The jumbo frame 34 can now be routed through the ESP network 12 by only looking at the outer stackable VLAN ID (this implies that there is only one routing path needed for all of customer A's VLANs through the ESP network 12).

As may now be appreciated, encapsulating each individual frame 32 into a jumbo frame 34 enables the Ethernet network 14 and the Ethernet gateway switch 30 to utilize a single VLAN to carry all of Customer A's different VLANs; this process is sometime referred to as VLAN stacking. The large number of VLANs needed for mapping to PVCs are thus confined inside the ATM interface in the Ethernet gateway switch. VLAN stacking, although not an industry standard, is a capability supported by many current equipment vendors to address scalability issues within existing VLAN frame tagging specifications. It should be noted that FIG. 2B depicts only one known format for enabling VLAN stacking, and that the present invention is not limited to the particular format used to encapsulate a customer's input frame.

The foregoing describes a technique for interworking Ethernet and ATM networks by mapping Ethernet Virtual Local Access Network (VLAN) identifiers (tags) to ATM network Permanent Virtual Circuits (PVCs) while conserving mapping assignments.

The above-described embodiments merely illustrate the principles of the invention. Those skilled in the art may make various modifications and changes that will embody the principles of the invention and fall within the spirit and scope thereof.

What is claimed is:

1. A method for communicating information frames from at least one of a first plurality of sites associated with a particular customer to at least one of a plurality of second sites associated with the same customer wherein said one first site is served by a first network and each second site is served by a second network, comprising the steps of:

receiving first information frames in a first service provider network from said one first site and encapsulating the first frames into a jumbo frame having a generic address of a first format that identifies said customer;

receiving at an interworking facility a jumbo frame and separating therefrom the first frames, each first frame having a first destination address of a first format specifying a corresponding one of the plurality of second sites to which each first frame is destined; the first destination address being in a first format compatible with said first network, and made available by the interworking facility by resolving destinations available to the first site through the second network, wherein the second network and first network use different protocol formats;

forming, for each first frame, a second frame of a second format compatible with the second network, wherein each second frame has an ATM format; and mapping the first destination address of each first frame to a second destination address specifying in the second format the address of the corresponding second site to which the second frame is destined so that the second network, upon receipt of the second destination address, can route each second frame to the corresponding second site, wherein the second destination address corresponds to a Permanent Virtual Circuit (PVC) provisioned in the second network for carrying said second frame to the corresponding second site.

2. A method for communicating information frames from at least one of a first plurality of sites associated with a particular customer to at least one of a plurality of second sites associated with the same customer wherein said one first site is served by an Ethernet network and each second site is served by a High Speed Packet network, comprising the steps of:

receiving Ethernet frames in a first service provider network from said one first site and encapsulating the Ethernet frames into jumbo Ethernet frames having a generic address that identifies said customer;

receiving at an interworking facility one of the jumbo frames and separating therefrom the Ethernet frames, each having a first destination address of an Ethernet format specifying a corresponding one of the plurality of second sites to which each Ethernet frame is destined; the first destination address being of an Ethernet format and made available by the interworking facility by resolving destinations available to the first site through the second network, wherein the second network and first network use different protocol formats;

forming, for each Ethernet frame, a second frame of a second format compatible with the second network, wherein each second frame has an ATM format; and mapping the first destination address of each Ethernet frame to a second destination address specifying in the second format the address of the corresponding second site to which the second frame is destined so that the second network, upon receipt of the second destination address, can route each second frame to the corresponding second site, wherein the second destination address corresponds to a Permanent Virtual Circuit (PVC) provisioned in the second network for carrying said second frame to the corresponding second site.

* * * * *